(12) United States Patent
Mutter et al.

(10) Patent No.: US 11,831,465 B2
(45) Date of Patent: Nov. 28, 2023

(54) OVERLAP DETECTION UNIT FOR A USER STATION OF A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 246 days.

(21) Appl. No.: 17/298,813

(22) PCT Filed: Dec. 11, 2019

(86) PCT No.: PCT/EP2019/084599
§ 371 (c)(1),
(2) Date: Jun. 1, 2021

(87) PCT Pub. No.: WO2020/120550
PCT Pub. Date: Jun. 18, 2020

(65) Prior Publication Data
US 2022/0060353 A1 Feb. 24, 2022

(30) Foreign Application Priority Data
Dec. 13, 2018 (DE) .................. 102018221679.7

(51) Int. Cl.
*H04L 12/40* (2006.01)
*G06F 13/42* (2006.01)
*H04L 12/413* (2006.01)

(52) U.S. Cl.
CPC ...... *H04L 12/4013* (2013.01); *G06F 13/4282* (2013.01); *H04L 12/40013* (2013.01); *H04L 12/40032* (2013.01); *H04L 12/413* (2013.01)

(58) Field of Classification Search
CPC ........... H04L 12/4013; H04L 12/40013; H04L 12/40032; H04L 12/413; G06F 13/4282
See application file for complete search history.

(56) References Cited

U.S. PATENT DOCUMENTS

2010/0306422 A1* 12/2010 Kodama ............... H04L 12/413
710/30
2018/0034658 A1* 2/2018 Kinage ................... H04B 1/38
(Continued)

FOREIGN PATENT DOCUMENTS

DE 102018202165 A1 6/2019
DE 102018202170 A1 6/2019

OTHER PUBLICATIONS

ISO 11898-1:2015 Standard, 2015, pp. 1-74.
International Search Report for PCT/EP2019/084599, dated Mar. 16, 2020.

*Primary Examiner* — Henry Tsai
*Assistant Examiner* — Harry Z Wang
(74) *Attorney, Agent, or Firm* — NORTON ROSE FULBRIGHT US LLP; Gerard Messina (57) ABSTRACT

An overlap detection unit for a user station of a serial bus system. The overlap detection unit includes a collision detection block for detecting bus states on a bus of the bus system, in which, in order to transmit a message, bus states of user stations of the bus system are generated on the bus with a first physical layer in a first communication phase, and are generated with a second physical layer in a second communication phase, the second physical layer being different from the first physical layer. The collision detection block generates a signal whose value indicates whether or not the bus states in the second communication phase have a level that corresponds to an overlap of the first and second (Continued)

physical layers or an overlap of two second physical layers, and the collision detection block is designed to output the signal for the user station.

16 Claims, 3 Drawing Sheets

(56) References Cited

U.S. PATENT DOCUMENTS

2019/0385057 A1* 12/2019 Litichever ............... H04L 63/14
2020/0136993 A1* 4/2020 Yun ....................... H04L 69/323

* cited by examiner

OVERLAP DETECTION UNIT FOR A USER STATION OF A SERIAL BUS SYSTEM, AND METHOD FOR COMMUNICATING IN A SERIAL BUS SYSTEM

The present invention relates to an overlap detection unit for a user station of a serial bus system and a method for communicating in a serial bus system, via which a communication in the bus system is selectively possible according to a first communication protocol or a second communication protocol, the communication according to the second communication protocol taking place at a higher bit rate than with the first communication protocol, and with a different physical layer.

BACKGROUND INFORMATION

For the communication between sensors and control units, for example in vehicles, more and more frequently a bus system is used in which data are transmitted as messages under the ISO 11898-1:2015 standard, as a CAN protocol specification with CAN FD. The messages are transferred between the user stations of the bus system, such as the sensor, control unit, transducer, etc. In the introduction phase, at the present time in the first step CAN FD is generally used in the vehicle with a data bit rate of 2 Mbit/s for the transfer of bits of the data field, and with an arbitration bit rate of 500 kbit/s for the transfer of all other bits, in particular the bits of the arbitration field.

For the transfer of the arbitration field as well as for the transfer of the data field, the same physical layer is used, which corresponds to the bit transfer layer or layer one of the conventional Open Systems Interconnection (OSI) model. A distinction is made between two bus states, namely, "dominant" (which corresponds to the logical or digital 0) and "recessive" (which corresponds to the logical or digital 1). Since the recessive bus state is not actively driven, the recessive bus state may be overwritten by the dominant bus state, thus making the arbitration possible. However, the recessive bus state is set only relatively slowly by terminating resistors of the bus system. On the one hand this prevents a faster data transfer. However, on the other hand the arbitration according to the above-mentioned ISO 11898-1: 2015 standard ensures that only one of the user stations transmits its data exclusively and free of collisions during the transfer of the data field. As a result, data are transferable via the bus more securely after the arbitration, without the need for repetition. Overall, this contributes to an acceleration of the data transfer.

Thus, in order to maintain the advantage of the arbitration while still increasing the transfer rate even further than previously, an approach must be found which mitigates the disadvantages of the slow transfer rate during the arbitration according to the above-mentioned ISO 11898-1:2015 standard. For a simple migration of existing bus systems, a further aim is to make it possible for user stations, which still operate according to the existing CAN protocol specifications, to also coexist with user stations in the bus system which already communicate according to a successor CAN protocol specification.

SUMMARY

An object of the present invention is to provide an overlap detection unit for a user station of a serial bus system, and a method for communicating in a serial bus system which solve the above-mentioned problems. In particular, an object of the present invention is to provide an overlap detection unit for a user station of a serial bus system, and a method for communicating in a serial bus system in which coexistence of user stations that communicate according to the ISO 11898-1:2015 standard or according to a successor CAN protocol specification is also possible.

The object may be achieved by an overlap detection unit for a user station of a serial bus system in accordance with the present invention. In accordance with an example embodiment of the present invention, the overlap detection unit includes a collision detection block for detecting bus states on a bus of the bus system, in which, in order to transmit a message, bus states of user stations of the bus system are generated with a first physical layer on the bus in a first communication phase, and may be generated with a second physical layer in a second communication phase, the second physical layer being different from the first physical layer, the collision detection block being designed to generate a signal whose value indicates whether or not the bus states in the second communication phase have a level that corresponds to an overlap of the first and second physical layers or an overlap of two second physical layers, and the collision detection being designed to output the signal for the user station.

"Overlap of the first and second physical layers" means that at least one bus state is observed which corresponds to an overlap of one or multiple bus states, which are generated by a first user station with the aid of the first physical layer, with one or multiple bus states which are generated by a second user station with the aid of the second physical layer.

In addition, "overlap of two second physical layers" means that at least one bus state is observed which corresponds to an overlap of one or multiple bus states, which are generated by a third user station with the aid of the second physical layer, with one or multiple bus states which are generated by a fourth user station with the aid of the second physical layer.

By use of the overlap detection unit, it is enabled that first user stations of the bus system, which use the same communication format as second user stations in a first communication phase, but in a second communication phase use a different communication format than the second user stations, may interfere with the communication of the second user stations; however, the interference may be quickly eliminated. For this purpose, the overlap detection unit on the bus may detect an overlap of physical layers which occurs, for example, due to overlap of a transmitted message with error frames (error flags). The error frames have been transmitted here, since a user station of the bus system has not detected that a communication of the second user stations is taking place at that time with a communication format that is different from the communication format of the transmitted error frame. In particular, the overlap detection unit may detect error frames (error flags) that are transmitted onto the bus in a communication format that is different from the communication format in which the host user station is at that time transmitting onto the bus in the second communication phase.

The overlap detection unit thus provides the necessary information that the host transceiver device may immediately abandon the driving of a signal for the frame onto the bus in the second communication phase of the frame. A short circuit and/or high currents on the bus is/are thus avoided. In addition, the transceiver device may pass on the information concerning the detected error frame to the host communication control device, so that the host communication control device also aborts the transmission and/or reception of the frame.

However, the overlap detection unit is designed in such a way that the use of error frames (error flags) in the arbitration phase as a first communication phase is possible.

Thus, in a first communication phase an arbitration in accordance with CAN may be carried out, and in a second communication phase the transfer rate may still be increased considerably compared to CAN FD. A communication of errors may thus be carried out in the arbitration phase and the data phase via error frames (error flags), even when different physical layers are used in the data phase than in the second communication phase.

As the result of transmitting the "res bit:=1" that is present in CAN FD, the user station allows a switch to be made over to a new frame format, and subsequently, due to the overlap detection unit, errors due to overlap of physical layer signals may be detected and communicated to the host node in order to handle the error.

Due to the coexistence and interoperability of user stations that operate according to the CAN FD communication protocol, and user stations that operate according to a CAN FD successor communication protocol, referred to below as CAN NG, a seamless migration path from CAN FD toward CAN NG is possible. Individual user stations of the bus system, which still are to use only CAN FD, may thus remain unchanged, whereas the CAN NG user stations, which may also transmit and receive CAN FD frames, may be equipped with the overlap detection unit. Therefore, no gateways between CAN FD and CAN NG bus systems are necessary.

The overlap detection unit described above may detect a bus error without data overhead. Therefore, the correct format switchover of all user stations does not have to be encoded in at least one bit of the frame in order to be able to check the correct format switchover. The overlap detection unit thus provides a very efficient and robust option for dealing with bus errors due to and/or during the format switchover of a frame. A large data overhead in each frame is thus avoided. Such a data overhead would also be disadvantageous due to the fact that, although bus errors with CAN seldom occur, they cannot be ruled out and therefore must be handled.

Advantageous further embodiments of the overlap detection unit in accordance with the present invention are disclosed herein.

According to one option of the present invention, the collision detection block is designed to detect whether bits for a frame of the message have different levels than the customary levels in the second communication phase. Alternatively or additionally, the collision detection block is designed to detect whether or not, for a digital signal for a frame of the message, two different bus states occur on the bus in the second communication phase.

The collision detection block is possibly designed to carry out a plausibility check of a detected overlap in order to decide whether the value of the signal is to be set to a value that indicates an overlap.

It is possible for the collision detection block to be designed to carry out the plausibility check with the aid of at least two different variants that are weighted differently in order to decide whether or not the overlap occurs.

In addition, it is possible for the overlap detection unit to also include a reception signal selection block for selecting a reception signal based on the signal that is generated by the collision detection block, and for outputting the selected reception signal to a communication control device of the user station.

According to one particular embodiment variant of the present invention, the overlap detection unit described above includes a data phase detection block for detecting the data phase of the message that is serially transferred on the bus, and a sender detection block for detecting whether or not the user station at that time is the sender of the message, the collision detection block being designed to generate the signal as a response to at least one detection result that the collision detection block has received from the data phase detection block and/or the sender detection block.

According to one option of the present invention, the data phase detection block is designed to detect a state on the bus in order to detect the data phase. According to another option, the data phase detection block is designed to evaluate a digital reception signal, generated from the message that is received from the bus, in order to detect the data phase.

The sender detection block may possibly be designed to evaluate a transmission signal that is transmitted from the user station to the bus. The sender detection block may be designed to count edge changes of the transmission signal in order to evaluate the transmission signal. Alternatively or additionally, the sender detection block may be designed to carry out a sequential decoding of the transmission signal in order to evaluate the transmission signal. Alternatively or additionally, the sender detection block may be designed to compare the transmission signal to a digital reception signal, generated from the message that is received from the bus, in order to evaluate the transmission signal.

In a first communication phase for transmitting the message onto the bus, it is possibly negotiated, between the user stations of the bus system, which of the user stations in a subsequent second communication phase has, at least temporarily, exclusive, collision-free access to the bus of the bus system, the second communication phase being a data phase in which useful data of the message are transferred on the bus.

In accordance with an example embodiment of the present invention, the overlap detection unit described above may be part of a user station for a serial bus system, the user station also including a communication control device for transmitting a message to a bus of the bus system and/or receiving a message from the bus of the bus system, and a transceiver device for transmitting the message onto the bus, the overlap detection unit being connected to the communication control device and to the transceiver device, and the transceiver device being designed, when transmitting at a first bit rate, to generate a first bus state for a first digital data state of the messages, and to generate a second bus state for the second digital data state of the messages, in such a way that the second bus state may overwrite the first bus state, and the transceiver device, when transmitting at a second bit rate that is higher than the first bit rate, being designed to generate different bus states in such a way that the bus states for the different digital data states of the messages cannot overwrite one another.

In addition, in accordance with an example embodiment of the present invention, the transceiver device, when transmitting at the second bit rate, may be designed to generate different bus states in such a way that the bus states for the different digital data states of the messages cannot overwrite one another, or when transmitting at the second bit rate, to generate the different bus states the same as when transmitting at the first bit rate.

At least two user stations described above may be part of a bus system that also includes a bus, so that the at least two user stations are connected to one another via the bus in such a way that they may communicate serially with one another. At least one of the at least two user stations is a user station described above.

The bus system described above possibly also includes at least one additional user station, which for transferring the message on the bus is designed only to generate bus states on the bus in a first and second communication phase of the message in such a way that the second bus state may overwrite the first bus state, the at least one additional user station being connected via the bus to the at least two user stations in such a way that the user stations may communicate serially with one another.

Moreover, the object stated above may be achieved by a method for communicating in a serial bus system according to an example embodiment of the present invention. In accordance with an example embodiment of the present invention, the method includes the steps: transmitting, via a transceiver device, messages onto a bus of the bus system, in which, in order to transmit a message, bus states of user stations of the bus system are generated on the bus with a first physical layer in a first communication phase and are generated with a second physical layer in a second communication phase, the second physical layer being different from the first physical layer, and/or receiving, via the transceiver device, messages from the bus of the bus system, detecting, via a collision detection block, bus states on the bus of the bus system, generating, via the collision detection block, a signal whose value indicates whether or not the bus states in the second communication phase have a level that corresponds to an overlap of the first and second physical layers or an overlap of two second physical layers, and outputting, via the collision detection block, the signal for the user station.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
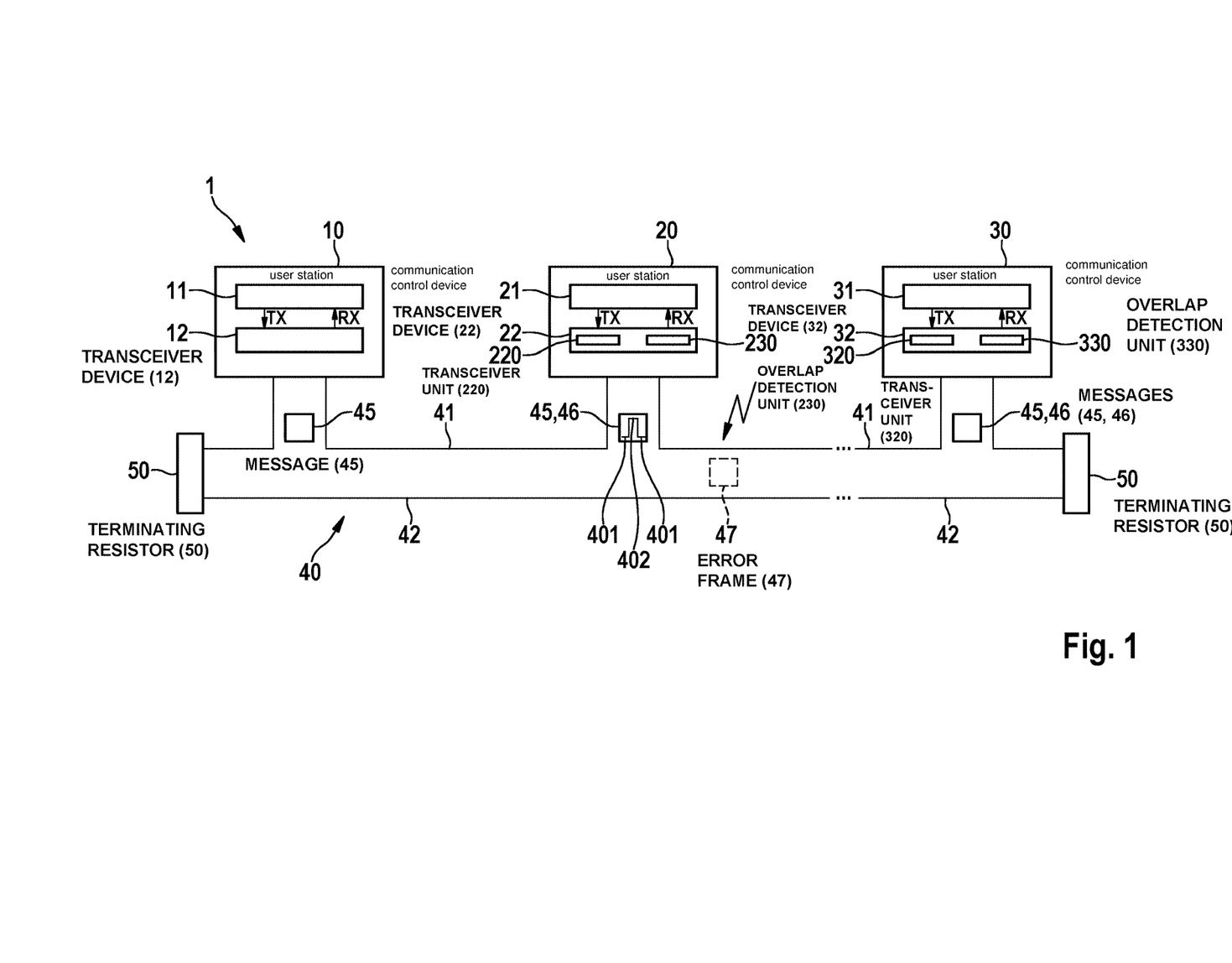
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN FD successor bus system, also referred to as a CAN NG bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a bus 40 via a first bus wire 41 and a second bus wire 42. Bus 40 at both of its ends is closed off via terminating resistors 50. Bus wires 41, 42 may also be referred to as CAN_H and CAN_L and, using a TX signal in the transmission state, are used for electrical signal transfer after coupling in the dominant levels or states 401, or generating or actively driving recessive levels or states 402. States 401, 402 are shown in a highly schematic manner only for user station 20. States 401, 402 correspond to the states of a TX signal of a transmitting user station 10, 20, 30. After signals CAN_H and CAN_L are transferred on bus wires 41, 42, the signals are received by user stations 10, 20, 30 as an RX signal. Via bus 40, messages 45, 46 in the form of signals CAN_H and CAN_L are serially transferable between individual user stations 10, 20, 30. If an error occurs during the communication on bus 40, as illustrated by the serrated dark block arrow in FIG. 1, an error frame 47 (error flag) is generally transmitted. User stations 10, 20, 30 are, for example, control units, sensors, display devices, etc., of a motor vehicle.

As shown in FIG. 1, user station 10 includes a communication control device 11 and a transceiver device 12. In contrast, user station 20 includes a communication control device 21 and a transceiver device 22 that includes a transceiver unit 220 and an overlap detection unit 230. User station 30 includes a communication control device 31 and a transceiver device 32 with a transceiver unit 320 and an overlap detection unit 330. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with another user station of user stations 10, 20, 30 connected to bus 40.

Communication control device 11 may be designed as a conventional CAN FD controller. Communication control device 11 creates and reads first messages 45, which are CAN FD messages, for example. CAN FD message 45 is built up according to the CAN FD format, in which a number of up to 64 data bytes may be included, which are transferred at a much faster, and thus higher, data rate than for a conventional CAN message. Transceiver device 12 may be designed as a conventional CAN FD transceiver. Thus, retrofitting user station 10 in bus system 1 is not necessary, even if CAN NG user stations 20, 30 are also operated in bus system 1.

Each of communication control devices 21, 31 creates and/or reads first messages 45 or second messages 46. Second messages 46 are built up based on a CAN NG format, described in greater detail below. Transceiver devices 22, 32 include a CAN transceiver unit 220, 320, respectively, which as needed may provide one of above-described first messages 45 in the CAN FD format or a second message 46 according to the CAN NG format for associated communication control device 21, 31, or may receive same from the communication control device. In addition, overlap detection units 230, 330 described in greater detail below are encompassed.

Formation and then transfer of messages 46 having the CAN NG format, and also the reception of such messages 46, are achievable by use of the two user stations 20, 30.

Figure 2:
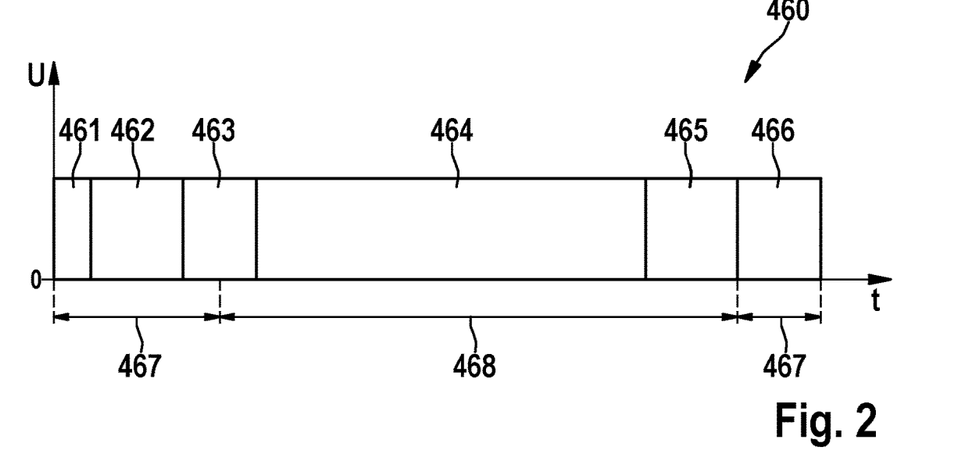
FIG. 2 shows a diagram for illustrating the design of messages that may be transmitted from user stations of the bus system according to the first exemplary embodiment of the present invention.

FIG. 2 shows for message 46 a CAN NG frame 460, which is transmitted from transceiver device 22 or transceiver device 32 onto bus 40 as a difference signal due to a TX signal or is received from the bus, from which the RX signal is generated. CAN NG frame 460 is divided into different fields for the CAN communication on bus 40, namely, a start field 461, an arbitration field 462, a control field 463, a data field 464, a check sum field 465, and an end field 466. Except for the differences of control field 463 described below, a frame for first message 45 is built up in the same way as frame 460. A data phase 468 begins after a certain bit of control field 463, with which a switchover is made from the arbitration phase to data phase 468. Data phase 468 thus includes a portion of control field 463 as well as data field 464 and check sum field 465. All other fields of frame 460 are part of arbitration phase 467.

Start field 461 includes one bit, for example, also referred to as an SOF bit, and indicates the start of frame. Arbitration field 462 contains an identifier including 32 bits, for example, for identifying the sender of the message.

Arbitration field 462 and/or control field 463 may additionally contain a piece of protocol format information made up of one or multiple bits, which is suitable for distinguishing CAN NG frames from CAN frames or CAN FD frames. However, the following description assumes that the CAN NG frame (second message 46) is identical to the frame format for CAN FD (first message 45) except for the FDF bit.

Control field 463 includes a piece of protocol format information, mentioned above, which is made up of one or multiple bits and which is suitable for distinguishing CAN NG frames from conventional CAN frames or CAN FD frames. Control field 463 contains a data length code that is 12 bits long, for example, which may assume values from 1 to 4096 with an increment of 1, or alternatively, values from 0 to 4095. The data length code may alternatively include fewer or more bits, and the value range and the increment may assume other values.

Data field 464 contains the useful data of the CAN NG frame or of message 46. The useful data may include up to 64 bytes or 4096 bytes, for example, or some other arbitrary number of bytes, corresponding to the value range of the data length code.

Check sum field 465 contains a check sum concerning the data in data field 464, including the stuff bits, which are inserted by the sender of message 46 as inverse bits after every 5 or 10 identical bits, for example.

End field 466 may contain at least one acknowledge bit, one negative acknowledge bit, and also a sequence of 11 identical bits that indicate end E of CAN NG frame 460. The at least one acknowledge bit may be used to communicate to the sending user station that a receiver has correctly received CAN NG frame 460 or message 46; the negative acknowledge bit may be used to communicate to the sending user station whether or not a receiver has discovered an error, which may also be referred to as a reception error, in received CAN NG frame 460 or message 46.

A physical layer, similarly as with conventional CAN and CAN FD, is used in arbitration phase 467. An important point during this phase is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, and the communication bandwidth is utilized very efficiently, which is very advantageous.

Consequently, the CSMA/CR method must provide so-called recessive states 402 on bus 40, which may be overwritten by other user stations 10, 20, 30 with dominant states 401 on bus 40. In recessive state 402, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

Control field 463 and data field 464 are transmitted by a sender of message 46 onto bus 40 only after user station 20 or user station 30, as the sender, has won the arbitration, and user station 20, as the sender for transmitting fields 463 through 466, thus has exclusive access to bus 40 of bus system 1. During the arbitration, with the aid of the identifier in arbitration field 462, bit-by-bit negotiation is carried out between user stations 10, 20, 30 concerning which user station 10, 20, 30 is allowed to transmit message 45, 46 having the highest priority, and therefore for the next time period for transmitting fields 463 through 465, obtains exclusive access to bus 40 of bus system 1.

The arbitration at the start of a frame 460 or of message 45, 46, and the acknowledgment in end field 466 at end E of frame 460 or of message 45, 46, is possible only when the bit time is much more than twice as long as the signal propagation time between two arbitrary user stations 10, 20, 30 of bus system 1. Therefore, the bit rate in arbitration phase 467 during transfer of fields 461, 462, 463 in part, and 466 is selected to be slower, and thus lower, than in the other fields of frame 460. In particular, in practice the bit rate in the arbitration phase is selected as 500 kbit/s, resulting in a bit time of approximately 2 µs, whereas the bit rate in data phase 468 is selected, for example, as 5 to 8 Mbit/s or greater, resulting in a bit time of approximately 0.2 µs or less. The bit time of the signal in arbitration phase 467 is thus greater than the bit time of the signal in data phase 468 by, for example, a factor of 10 or 16, etc. The factor for the bit time is arbitrarily selectable.

Each of user stations 10, 20, 30 may transmit and receive CAN FD frames, but user station 10 cannot transmit or receive CAN NG frames 460. For example, if user station 20 transmits a CAN NG frame 460 that CAN FD user station 10 cannot understand, overlap detection units 230, 330 become active at least for CAN FD user station 20 as sender and receiver, optionally also for CAN NG user station 30 strictly as receiver. For example, if CAN FD user station 10 does not detect, in particular due to a bit error, that a CAN NG frame 460 is now transmitted, and transmits an error frame (error flag), this results in an overlap of the two physical layers that is recognized by active overlap detection unit 230, 330, eliminated, and signaled to the host node, or more precisely, communication control device 21, 31. This also encompasses, for a local bit error in the res bit, that user station 10 or user station 30 transmits an error frame 47 because user station 10, 30 in question erroneously assumes that this is a CAN FD frame (message 45), and therefore after a pair of bits establishes an error, for example a stuffing error, in received frame 460 which is incorrectly regarded as CAN FD frame 450. Accordingly, the method carried out by user stations 20, 30 also allows in bus system 1 at least one CAN FD user station 10 that transmits messages according to the CAN FD protocol and does not understand CAN NG frame 460. In addition, the method carried out by user stations 20, 30 also allows messages 45, 46 having various communication formats, namely, CAN FD or CAN NG in the present example, to be transmitted in bus system 1.

In the new, alternative frame format, namely, frame 460 of CAN NG message 46, a switchover is made from the CAN FD frame format to the CAN NG frame format with the aid of res bits in control field 463. The frame formats of CAN FD and CAN NG are the same except for the res bit. Thus, user stations 20, 30 each also support CAN FD. A switch may subsequently be made over to a different physical layer that allows a higher bit rate than in preceding arbitration phase 467. Thus, by use of a first physical layer, first bus state 401 for a first digital data state of messages 46 is generated and a second bus state 402 for the second digital data state of messages 46 is generated in such a way that first bus state 401 may overwrite second bus state 402, i.e., the dominant bus state may overwrite the recessive bus state. According to one variant, the second physical layer may be used to generate different bus states 401, 402 in such a way that bus states 401, 402 are not able to overwrite one another for the different digital data states of messages 46. Thus, there are no dominant or recessive bus states for the second physical layer.

In the CAN FD protocol, the res bit is already reserved for new formats. In this regard, res=0 identifies the CAN FD frame format. In contrast, res=1 identifies new, alternative frame format 460 that is used by CAN NG. If a user station 10 recognizes a res=1, user station 10 goes into the protocol exception state, which corresponds to a passive waiting state. A departure is not made from this waiting state until such a user station 10 detects 11 recessive bits in succession.

In the event of an error of transmission signal TX or TX signal in the res bit, user station 20, 30 transmitting the TX signal, i.e., the TX user station, transmits an error frame 47 (error flag), as shown in FIG. 1, and does not switch over to the alternative format according to frame 460. The treatment of a possible error response due to an error of reception signal RX or the RX signal in a receiving user station 10, 20, 30 or RX user station takes place using overlap detection units 230, 330. This is described below with reference to FIGS. 3 and 4.

Overlap detection units 230, 330 thus make it possible for user stations 10, 20, 30 to coexist in bus system 1, since, although a user station 10, 20, 30 that has not detected the switchover to the format of CAN NG frame 460 does transmit an error frame 47 that results in an overlap of the physical layer, the overlap is detected and may be eliminated. In particular, during the data phase of the CAN NG frame, an error frame 47 cannot trigger a "short circuit" when the transceiver device of the sender of CAN NG frame 460, which is part of the TX node or the TX user station, and the transceiver device which transmits error frame 47 and is part of the RX node or an RX user station, drive against one another.

In general, in bus system 1 with CAN NG, the following properties which differ in comparison to CAN FD may be implemented:

a) acquiring and optionally adapting proven properties that are responsible for the robustness and user-friendliness of CAN FD, in particular a frame structure including identifiers and arbitration according to the CSMA/CR method, b) a substantial increase in the net data transfer rate, c) in data phase 468, CAN NG uses a different physical layer than does CAN FD, for example a physical layer in which both bus states are actively driven, and error frames (error flags) are not provided during data phase 468. With such a physical layer for CAN NG, much higher bit rates may be achieved than with CAN FD.

Figure 3:
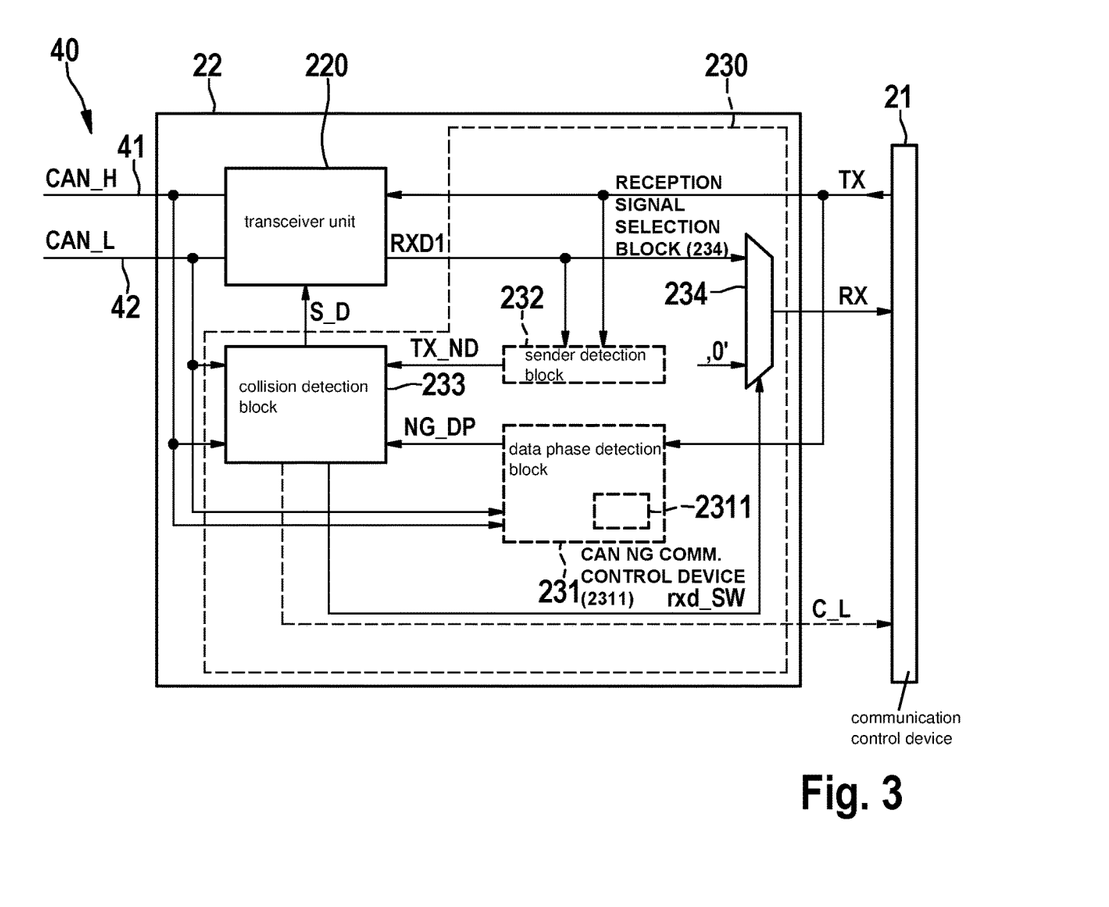
FIG. 3 shows a diagram for illustrating the design of an overlap detection unit that is installed in user stations of the bus system according to the first exemplary embodiment of the present invention.

FIG. 3 shows an example of the design of overlap detection unit 230 in transceiver device 22. Overlap detection unit 330 has the same design, so that the following description also applies to overlap detection unit 330.

Transceiver device 22 includes transceiver unit 220, which is designed to provide the appropriate physical layers for the various phases of CAN FD messages 45 and of CAN NG messages 46 for bus 40. In addition, transceiver unit 220 is designed to receive CAN FD messages 45 and to receive CAN NG messages 46 from bus 40. Transceiver unit 220 may in each case switch over between transmitting and/or receiving CAN FD messages 45 and transmitting and/or receiving CAN NG messages 46. Transceiver unit 220 is connected to bus wires 41, 42 in order to receive signals CAN_H and CAN_L, and is connected to overlap detection unit 230.

At overlap detection unit 230, the digital TX signal, also referred to as transmission signal TXD, is received from communication control device 21 and output to transceiver unit 220. Taking into account an input signal S_D, transceiver unit 220 encodes the TX signal on the particular physical layer used for the different communication phases, namely, arbitration phase 467 or data phase 468, of messages 45, 46. At the same time, transceiver unit 220 decodes the state on bus 40, i.e., signals CAN_H, CAN_L on bus wires 41, 42, and passes on the result as a digital RXD1 signal to overlap detection unit 230. As described below, overlap detection unit 230 generates the digital RX signal, also referred to as reception signal RXD, from the RXD1 signal.

If CAN NG physical layer is such that both bus states 401, 402 are driven in data phase 468 of CAN NG frame 460, transceiver unit 220 deduces that while signal S_D is set (S_D="1"), bus 40 is not allowed to be driven and must be high-impedance, for example.

Overlap detection unit 230 includes a data phase detection block 231, a sender detection block 232, a collision detection block 233, and a reception signal selection block 234. Since data phase detection block 231 and sender detection block 232 are optional, they are illustrated by dashed lines.

Optional data phase detection block 231 records or detects data phase 468 of CAN NG frame 460. Data phase detection block 231 signals with the aid of digital signal NG_DP whether a frame transfer is present in data phase 468 of a CAN NG frame 460. For example, NG_DP:=1 applies when a transfer of a CAN NG frame 460 is present in data phase 468 at that time; otherwise, NG_DP:=0.

For this purpose, data phase detection block 231 uses signal RXD1. Data phase detection block 231 includes a very simplified CAN NG communication control device 2311 for this purpose. CAN NG communication control device 2311 observes signal RXD1 from transceiver unit 220, and may thus predict exactly when data phase 468 begins and when data phase 468 ends. The end of data phase 468 depends on the number of transferred bytes. The number of useful data bytes in data field 464 is encoded in the data length field at the start of data phase 468. Data phase detection block 231 may thus determine the end of data phase 468 by counting bits.

In addition, data phase detection block 231 uses signals CAN_H and CAN_L in order to decide whether data phase 468 is taking place at that time. Since CAN NG uses a different physical layer for data phase 468 than for arbitration phase 467, in data phase 468 of a CAN NG frame 460, different differential voltages occur between CAN_H and CAN_L than in data phase 468 of a CAN FD message 45. Data phase detection block 231 thus recognizes, based on the differential voltage of the physical layer used, whether the transfer of a CAN NG frame 460 is present in data phase 468.

By combining the two detection results from signal RXD1 and bus signals CAN_H, CAN_L, it is possible for data phase detection block 231 to always make a majority decision or AND decision; i.e., data phase detection block 231 sets signal NG_DP=1 only when both detection results show that data phase 468 is present at that time.

However, the most conservative and thus the most reliable is the alternative option that as soon as one of the detection results from signal RXD1 and bus signals CAN_H, CAN_L indicates that data phase 468 is present, data phase detection block 231 assumes this to be true.

The combination of the two detection results from signal RXD1 and bus signals CAN_H, CAN_L, as a variant for detecting data phase 468, is very robust against disturbances at bus 40. Such a disturbance could be that a bit error in the RXD1 data stream due to irradiation leads communication control device 2311 in data phase detection block 231 to believe that frame 460 is shorter than in reality, or that a CAN FD message 45 is transferred.

Optionally, signal NG_DP is relayed to communication control device 21. If communication control device 21 is only the receiver of frame 460, communication control device 21 may deduce, based on signal NG_DP, why bus 40 is blocked for so long, namely, because of a CAN NG frame 460.

Optional sender detection block 232 records or detects whether or not user station 20 at that time is the sender of message 45, 46. As a result, sender detection block 232 signals to collision detection block 233 with the aid of a signal TX_ND whether or not user station 20 is transmitting at that time. For example, TX_ND:=1 applies when user station 20 is transmitting at that time. Otherwise, TX_ND:=0 applies.

Sender detection block 232 observes signal TX provided by communication control device 21, and for example counts the number of edge changes of signal TX in a predetermined time period T. If more than 0 edge changes have occurred in predetermined time period T, sender detection block 232 decides that user station 20, i.e., the host user station, is transmitting at that time. To check the plausibility of this information, sender detection block 232 may optionally count the number of edge changes at signal RXD1 in predetermined time period T. If the number of edge changes in signals TX, RXD1 is similar and has at least a value >0, sender detection block 232 decides that user station 20 is transmitting at that time.

Alternatively, sender detection block 232 may be designed as a counter for carrying out the recording or detection. In particular, a counter may be used which is incremented by one edge at transmission signal TX and decremented by one edge at reception signal RX. If the value of the counter is clearly negative, sender detection block 232 decides that user station 20 is not transmitting at that time.

"Clearly negative means" that sender detection block 232 takes a predetermined threshold value as a reference in order to make the stated decision. Otherwise, sender detection block 232 decides that user station 20 is transmitting at that time. Sender detection block 232 resets the counter between two messages 45, 46.

Collision detection block 233 detects whether bus 40 is additionally operated in the CAN FD mode by a user station during data phase 468 of a CAN NG frame 460, namely, since this user station transmits an error frame 47 (error flag), as described above. If this is the case, collision detection block 233 responds to this, since during data phase 468 of a CAN NG frame 46, the physical layer is allowed to be operated only by a single CAN NG transceiver device, namely, the sender of frame 460. Otherwise, if one of receiving user stations 10, 20, 30 in the CAN FD mode transmits an error frame 47 (error flag) during data phase 468 of a CAN NG frame 460, the two physical layers then overlap. As a result, the bits of frame 460 now have different levels for at least one of bus states 401, 402, so that differential voltage VDIFF between CAN_H and CAN_L is different than it should be in CAN NG data phase 468. This is illustrated in elliptically framed area U_P of differential voltage VDIFF from FIG. 4. The levels most likely also differ from the levels for CAN FD.

Collision detection block 233 from FIG. 3 knows in which value range the levels are in when there is an overlap of the physical layers. Therefore, collision detection block 233 may compare the levels on bus 40 to the value range of the levels when there is an overlap. Additionally or alternatively, collision detection block 233 may compare the levels on bus 40 to the value range of the levels during normal operation, i.e., when no overlap of the physical layers occurs, as illustrated in the remaining areas of differential voltage VDIFF from FIG. 4.

Alternatively, depending on the design of the CAN NG physical layer for data phase 468, collision detection block 233 may detect an overlap of the physical layers in such a way that collision detection block 233 recognizes that the level for the one bus state 401, 402 no longer appears while the CAN FD node is transmitting its error frame 47 (error flag). Specifically, this means that collision detection block 233 observes whether, during a time x, both bus levels, namely, for bits 0 and 1, i.e., bus states 401 and 402, appear on bus 40. If collision detection block 233 "sees" only the levels for the one bit, namely, for bit 0 or bit 1, the overlap of the physical layer for CAN FD on the physical layer for CAN NG is recorded or detected.

Figure 4:
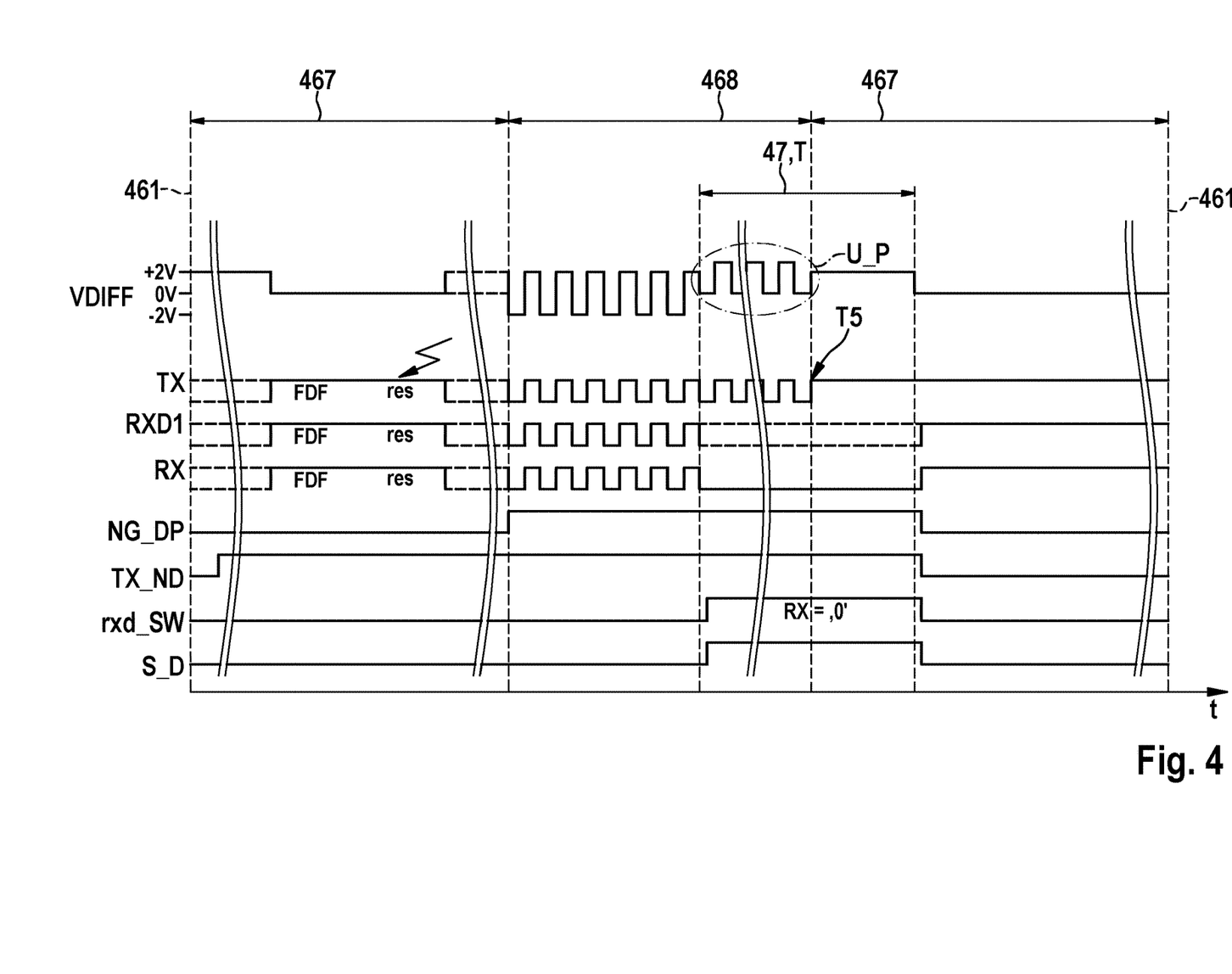
FIG. 4 shows a signal-time diagram for various signals that are transmitted according to the first exemplary embodiment of the present invention during operation of the bus system.

For detecting error frame 47 or some other overlap of physical layers, collision detection block 233 continuously monitors the levels of the individual bits, and thus recognizes whether a user station 10, 30 is transmitting an error frame 47 in the CAN FD mode during CAN NG data phase 460, as shown in FIG. 4 in area U_P of differential voltage VDIFF.

If collision detection block 233 detects at least one bus level that indicates an overlap of the physical layers, collision detection block 233 from FIG. 3 may optionally use further information for a plausibility check. At least one of the following options for the plausibility check is optionally usable for this purpose. In particular, it is possible to combine the results of individual plausibility checks in a weighted manner in order to arrive at the most robust decision possible with regard to the overlap of the bus levels.

According to a first option for the plausibility check, collision detection block 233 takes into account that the bits of a CAN FD error frame 47 are very long compared to the bits in data phase 468 of CAN NG frame 460. Instead of responding immediately, collision detection block 233 may further observe the bus levels or bus states 401, 402 for an additional observation time T in order to see whether bus levels that indicate an overlap continue to occur. For selecting additional observation time T, in collision detection block 233 the knowledge may be utilized that a CAN error frame 47 has a length of 6 bits, a sequence of error frame 47 has a length of 12 bits, and the bit rate of error frame 47 is at most 1 Mbit/s. For example, T could be selected to be equal to 6*1000 ns, which corresponds to the minimum length of a CAN error frame 47, as shown in FIG. 4.

According to a second option for the plausibility check, collision detection block 233 from FIG. 3 takes into account signal NG_DP generated by data phase detection block 231 and outputs it to collision detection block 233. Based on input signal NG_DP, collision detection block 233 knows that a transfer is present on bus 40 in data phase 468 of a frame 460. Since an overlap of bus levels can occur only during data phase 468 of a frame 460, collision detection block 233 may utilize this knowledge. For example, signal NG_DP may be used to activate collision detection block 233. In this case, for NG_DP="1," collision detection block 233 would become active and observe the bus levels. In all other cases, collision detection block 233 would be deactivated.

As an alternative to the second option for the plausibility check, collision detection block 233 may continuously observe bus levels or bus states 401, 402, and if, for example, an overlap has already been observed for a fairly long time, a response may still be made, even if NG_DP="0."

For all options mentioned above, collision detection block 233 generates signal S_D. Collision detection block 233 outputs signal S_D to transceiver unit 220. If an overlap has been recorded or detected and optionally checked for plausibility, as described above, collision detection block 233 sets signal S_D="1." Otherwise, signal S_D="0." Signal S_D remains at the value "1" until a certain time has elapsed, for example, or until signal NG_DP="0" once again applies, for example.

For the present example of CAN bus system 1, it is assumed that during CAN NG data phase 468 only one user station is allowed to transmit, namely, the TX node, i.e., user station 20 or user station 30 in the present example. Thus, signal S_D is actually to be set only when this user station is the transmission node of CAN NG frame 460. Therefore, there is the option for overlap detection unit 230 to set signal S_D as S_D="1" only when user station 20 is the sender of message 46, i.e., user station 20 is the TX user station. Signal TX_ND indicates whether user station 20 is a TX user station at that time. In particular, in the simplest case, signal S_D may be AND-linked to signal TX_ND.

In order to inform user stations 20, 30, or more precisely, their communication control devices 21, 31, of the occurrence of the overlap on the physical layer, collision detection block 233 generates at least one signal, namely, a signal rxd_SW and optionally a signal C_L.

Reception signal selection block 234 may in particular be designed as a multiplexer. With the aid of signal rxd_SW and reception signal selection block 234, signal RX for host communication control device 21 is set to a fixed value, for example "0," as shown in FIG. 3. Alternatively, signal RX may be set to the fixed value "1." Due to the fact that a long phase having only one value, for example the value "0," cannot occur in CAN NG data phase 468, CAN NG user station 20, or more precisely, its communication control device 21, as a transmitting and receiving user station recognizes that an overlap has occurred on the physical layer of frame 460. The transmitting and receiving user station may now respond to this information. In particular, CAN NG transceiver unit 220 of transceiver device 22 and/or communication control device 21 of previously sending user station 20 may abandon the transmission and switch from data phase 468 into arbitration phase 467. In particular, CAN NG user station 20 may abandon the reception and likewise switch from data phase 468 into arbitration phase 467. All user stations 10, 20, 30 at bus 40, i.e., also user station 10 (also CAN FD), may wait for a long recessive phase (corresponding to ISO 11898-1:2015) before one or multiple user stations 10, 20, 30 start with the transmission of a frame 450, 460.

With the aid of optional signal C_L, collision detection block 233 and thus overlap detection unit 230 signals to host communication control device 21 that an undesirable overlap has occurred on the physical layer. With this knowledge, communication control device 21 itself, for example, could instruct transceiver unit 220 to abandon the transmission.

FIG. 4 shows an example of the above-mentioned signals as a function of time t for the case that user station 20 transmits a message 46 onto bus 40, i.e., acts as a TX user station. A user station of bus system 1, for example, user station 30, as receiver of message 46, i.e., as an RX user station, is mistakenly waiting for a CAN FD message 45 due to the error illustrated by the serrated dark block arrow, although a CAN NG message 46 is transmitted. In such a case, user station 30 will detect an error in data phase 468 and transmit CAN error frame (error flag) 47 onto bus 40. The RX user stations transmit error frame 47 in the time period as indicated in FIG. 4. This results in an overlap of the physical layers of CAN NG data phase 468 and the physical layer of error frame 47, as denoted in FIG. 4 by reference symbol U_P at signal VDIFF=CAN_H−CAN_L on bus 40. In the example, it has been assumed that in CAN NG data phase 468, a logical 1 has a VDIFF=+2 V, and a logical 0 has a VDIFF=−2 V. Of course, other values for VDIFF are possible. An error frame (error flag) 47 corresponds to 6 dominant bits, and is correspondingly driven with a differential voltage of VDIFF=+2 V. This results in the overlap denoted by reference symbol U_P.

An arbitrary value of a signal is illustrated by dashed lines in FIG. 4. The propagation times of the signals are assumed to be 0 in FIG. 4 for easier understanding of the signal-time diagram of FIG. 4.

At signal RX from FIG. 4 and signal S_D from FIG. 4 it is apparent that the overlap of the physical layers has been detected. At signals rxd_SW and RX it is apparent that overlap detection unit 230 of the host user station, i.e., communication control unit 21 here, communicates the overlap. In addition, it is apparent at signal TX that, starting at a point in time T5, user station 20 stops transmitting message 46, since user station 20 has detected a phase in which signal RX has had the value "0" for a long time.

According to a second exemplary embodiment, data phase detection block 231 carries out its detection only using bus signals CAN_H, CAN_L. Otherwise, the function of overlap detection unit 230 is designed as in the preceding exemplary embodiment.

The variant of data phase detection block 231 according to the present exemplary embodiment is thus less complicated than the variant of data phase detection block 231 according to the preceding exemplary embodiment. However, in the present exemplary embodiment, a disturbance that is recognizable only via the detection and evaluation of signal TXD1 cannot be identified.

According to a third exemplary embodiment, data phase detection block 231 carries out its detection only using signal TX. Otherwise, the function of overlap detection unit 230 is designed as in the first exemplary embodiment.

The variant of data phase detection block 231 according to the present exemplary embodiment is thus less complicated than the variant of data phase detection block 231 according to the first exemplary embodiment. However, in the present exemplary embodiment, a disturbance that is recognizable only via the detection and evaluation of bus signals CAN_H, CAN_L cannot be identified.

According to a fourth exemplary embodiment, sender detection block 232 is designed as a simplified CAN NG communication control device that uses signal TX as an input signal. Due to the sequential decoding of transmitted CAN NG frame 460, the simplified CAN NG communication control device may very easily and reliably decide whether or not user station 20, i.e., the host user station, is a sender. If signal TX remains at the value 1, for example beginning with a certain bit during arbitration phase 467, the simplified CAN NG communication control device deduces that user station 20, i.e., the host user station, has lost the arbitration, i.e., is not the sender.

This embodiment of sender detection block 232 for detecting whether user station 20 is the sender is more robust or more reliable than the embodiment of sender detection block 232 according to the first exemplary embodiment. However, the present embodiment of sender detection block 232 has higher resource requirements than the embodiment of sender detection block 232 according to the first exemplary embodiment.

All of the above-described embodiments of communication control devices 21, 31, of transceiver devices 22, 32, of overlap detection units 230, 330, of user stations 10, 20, 30 of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Above-described bus system 1 according to the exemplary embodiments is described with reference to a bus system based on the CAN protocol. However, bus system 1 according to the exemplary embodiments may also be some other type of communications network in which data are serially transferable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 10 in bus system 1 may be dispensed with. In this case, overlap detection units 230, 330 are necessary when user stations 20, 30 are also able to transmit in the CAN FD format, so that the overlaps during data phase 468 of CAN NG frame 460 are recognized and handled when one of user stations 20, 30 has not successfully switched over to the format of data phase 468 of CAN NG frame 460. It is possible for one or more of user stations 20 or 30 to be present in bus system 1.

At least one of overlap detection units 230, 330 is possibly situated externally from associated transceiver device 22, 32. In particular, at least one of overlap detection units 230, 330 is provided as a separate unit of user station 20, 30.

What is claimed is:

1. An overlap detection unit for a user station of a serial bus system, comprising:
   a collision detection block that detects bus states on a bus of the bus system, in which bus system, to transmit a message, bus states of user stations of the bus system are generated on the bus with a first physical layer in a first communication phase, and are generated with a second physical layer in a second communication phase, the second physical layer being different from the first physical layer, and for generating a signal whose value indicates whether the bus states in the second communication phase have a level that corresponds to an overlap of the first and second physical layers or an overlap of two second physical layers, and for outputting the signal for the user station.

2. The overlap detection unit as recited in claim 1, wherein it is detected whether: (i) the bits for a frame of the message have different levels than customary levels in the second communication phase, and/or (ii) two different bus states occur on the bus in the second communication phase for a digital signal for a frame of the message.

3. The overlap detection unit as recited in claim 1, wherein a plausibility check of a detected overlap is carried out to decide whether the value of the signal is to be set to a value that indicates the overlap.

4. The overlap detection unit as recited in claim 3, wherein the the plausibility check is carried out using at least two different variants that are weighted differently to decide whether the overlap occurs.

5. The overlap detection unit as recited in claim 1, wherein
   a reception signal is selected based on the signal that is generated by the collision detection block, and the selected reception signal is output to a communication control device of the user station.

6. The overlap detection unit as recited in claim 1, wherein
   a a data phase of the message, which is serially transferred on the bus, is detected, and/or
   a it is detected whether the user station at that time is a sender of the message;
   wherein the collision detection block generates the signal as a response to at least one detection result that the collision detection block has received from the data phase detection block and/or the sender detection block.

7. The overlap detection unit as recited in claim 6, wherein the data phase detection block also detects a state on the bus to detect the data phase, and/or the data phase detection block evaluates a digital reception signal, generated from the message that is received from the bus, to detect the data phase.

8. The overlap detection unit as recited in claim 6, wherein the sender detection block evaluates a transmission signal that is transmitted from the user station to the bus.

9. The overlap detection unit as recited in claim 8, wherein the edge changes of the transmission signal are counted to evaluate the transmission signal, and/or to carry out a sequential decoding of the transmission signal in to evaluate the transmission signal, and/or to compare the transmission signal to a digital reception signal, generated from the message that is received from the bus, to evaluate the transmission signal.

10. The overlap detection unit as recited in claim 1, wherein in the first communication phase for transferring the message onto the bus, it is negotiated, between the user stations of the bus system, which of the user stations in a subsequent second communication phase has, at least temporarily, exclusive, collision-free access to the bus of the bus system, and the second communication phase is a data phase in which useful data of the message are transferred on the bus.

11. A user station for a serial bus system, comprising:
a communication control device that transmits a message to a bus of the bus system and/or to receive a message from the bus of the bus system;
a transceiver device that transmits the message onto the bus and/or receive the message from the bus; and
an overlap detection unit, connected to the communication control device and the transceiver device, the overlap detection unit including a collision detection block for detecting bus states on the bus of the bus system, in which bus system, to transmit a message, bus states of user stations of the bus system are generated on the bus with a first physical layer in a first communication phase, and are generated with a second physical layer in a second communication phase, the second physical layer being different from the first physical layer, the collision detection block generating a signal whose value indicates whether the bus states in the second communication phase have a level that corresponds to an overlap of the first and second physical layers or an overlap of two second physical layers, and wherein the collision detection block is for outputting the signal for the user station;
wherein the transceiver device, when transmitting at a first bit rate, also generates a first bus state for a first digital data state of messages, and generates a second bus state for the second digital data state of the messages, so that the second bus state overwrites the first bus state, and the transceiver device, when transmitting at a second bit rate that is higher than the first bit rate, also generates different bus states so that the first and second bus states for the different digital data states of the messages cannot overwrite one another.

12. The user station as recited in claim 11, wherein the transceiver device, when transmitting at the second bit rate, also generates different bus states so that the bus states for the different digital data states of the messages cannot overwrite one another, or when transmitting at the second bit rate, to generate the different bus states the same as when transmitting at the first bit rate.

13. A bus system, comprising:
a bus; and
at least two user stations that are connected to one another via the bus so that they communicate serially with one another, and of which at least one user station is a user station including:
a communication control device that transmits a message to the bus of the bus system and/or to receive a message from the bus of the bus system;
a transceiver device that transmits the message onto the bus and/or receive the message from the bus; and
an overlap detection unit that is connected to the communication control device and the transceiver device, the overlap detection unit including a collision detection block that detects bus states on the bus of the bus system, in which bus system, to transmit a message, bus states of user stations of the bus system are generated on the bus with a first physical layer in a first communication phase, and are generated with a second physical layer in a second communication phase, the second physical layer being different from the first physical layer, the collision detection block also generates a signal whose value indicates whether the bus states in the second communication phase have a level that corresponds to an overlap of the first and second physical layers or an overlap of two second physical layers, and wherein the collision detection block also outputting the signal for the user station;
wherein the transceiver device, when transmitting at a first bit rate, generates a first bus state for a first digital data state of messages, and generates a second bus state for the second digital data state of the messages, so that the second bus state overwrites the first bus state, and the transceiver device, when transmitting at a second bit rate that is higher than the first bit rate, generates different bus states so that the first and second bus states for the different digital data states of the messages cannot overwrite one another.

14. The bus system as recited in claim 13, further comprising:
at least one additional user station, which for transferring the message on the bus, and which generates bus states on the bus in a first and second communication phases of the message only so that the second bus state overwrites the first bus state, the at least one additional user station being connected via the bus to the at least two user stations so that the user stations communicate serially with one another.

15. A method for communicating in a serial bus system, the method comprising:
transmitting messages onto a bus of the bus system, in which bus system, to transmit a message, bus states of user stations of the bus system are generated on the bus with a first physical layer in a first communication phase, and are generated with a second physical layer in a second communication phase, the second physical layer being different from the first physical layer, and/or receiving messages from the bus of the bus system;
detecting the bus states on the bus of the bus system;
generating a signal whose value indicates whether the bus states in the second communication phase have a level that corresponds to an overlap of the first and second physical layers or an overlap of two second physical layers; and
outputting the signal for the user station.

16. A non-transitory computer readable medium having a computer program, which is executable by a processor, comprising:
a program code arrangement having program code for communicating in a serial bus system, by performing the following:
transmitting messages onto a bus of the bus system, in which bus system, to transmit a message, bus states of user stations of the bus system are generated on the bus with a first physical layer in a first communication phase, and are generated with a second physical layer in a second communication phase, the second physical layer being different from the first physical layer, and/or receiving-messages from the bus of the bus system;
detecting the bus states on the bus of the bus system;
generating a signal whose value indicates whether the bus states in the second communication phase have a level that corresponds to an overlap of the first and second physical layers or an overlap of two second physical layers; and outputting the signal for the user station.

\* \* \* \* \*